(12) United States Patent
Ogata et al.

(10) Patent No.: US 7,996,844 B2
(45) Date of Patent: Aug. 9, 2011

(54) LOAD DISTRIBUTION CONTROL SYSTEM AND METHOD

(75) Inventors: Yoko Ogata, Odawara (JP); Hidenori Suzuki, Odawara (JP)

(73) Assignee: Hitachi, Ltd., Tokyo (JP)

( * ) Notice: Subject to any disclaimer, the term of this patent is extended or adjusted under 35 U.S.C. 154(b) by 1339 days.

(21) Appl. No.: 11/517,294

(22) Filed: Sep. 8, 2006

(65) Prior Publication Data

US 2008/0007765 A1    Jan. 10, 2008

(30) Foreign Application Priority Data

Jul. 7, 2006 (JP) ................................. 2006-187997

(51) Int. Cl.
  *G06F 9/46*  (2006.01)
  *G06F 12/00*  (2006.01)
(52) U.S. Cl. ........................... 718/104; 718/105; 71/100
(58) Field of Classification Search .......... 718/104–105; 711/100
  See application file for complete search history.

(56) References Cited

U.S. PATENT DOCUMENTS

| 2003/0195895 | A1* | 10/2003 | Nowicki et al. | 707/100 |
| 2004/0237088 | A1* | 11/2004 | Miki et al. | 718/102 |
| 2005/0138315 | A1* | 6/2005 | Eguchi et al. | 711/165 |
| 2006/0059489 | A1* | 3/2006 | Koyanagi | 718/100 |

FOREIGN PATENT DOCUMENTS

| JP | 05-081090 | 4/1993 |
| JP | 07-234847 | 9/1995 |
| JP | 10-049504 | 8/1996 |
| JP | 10-334057 | 6/1997 |
| JP | 11-003323 | 6/1997 |
| JP | 2002-073576 | 3/2002 |
| JP | 2003-296152 | 10/2003 |

OTHER PUBLICATIONS

Griffin, Ivan; Linux Network Programming Part 2, Linux Japan, Japan, Laser 5, Sep. 1, 1998, vol. 1, Issue 2, pp. 104-109; 12 pages.
Griffin, Ivan et al.; Linux Network Programming, Part 2, Mar. 1, 1998; 16 pages.

\* cited by examiner

*Primary Examiner* — Kenneth Tang
(74) *Attorney, Agent, or Firm* — Foley & Lardner LLP

(57) ABSTRACT

Processing time for job execution is shortened by using computation capability to the maximum extent possible.
When a user makes a job request, the job request is sent from an LDS program of a first computer to a second computer; the second computer executes data preparation processing and empty area reservation processing with regard to a storage unit (disk A) and stores the results to an the FIFO of the first computer; when the output from the FIFO is transferred via a job release program to the LDS program, the transferred content is then transferred to a third computer; and the third computer selects a computer that should execute the job, from among a group of computers and commands the selected computer to execute the job.

14 Claims, 14 Drawing Sheets

LOAD DISTRIBUTION CONTROL SYSTEM AND METHOD

CROSS-REFERENCES TO RELATED APPLICATIONS

This application relates to and claims priority from Japanese Patent Application No. 2006-187997, filed on Jul. 7, 2006, the entire disclosure of which is incorporated herein by reference.

BACKGROUND

1. Field of the Invention

The invention relates to a load distribution control system, including a plurality of computers, for having the computers execute jobs by distributing loads for the computers, and also relates to a load distribution control method.

2. Description of Related Art

Recently, various computer load distribution techniques have been suggested (see JP-A-1049504, JP-A-11-3323, and JP-A-10-334057). As computers have achieved high performance, when controlling load distribution, the processing time (Turn Around Time [TAT]) spent to obtain the processing results for an executed job varies considerably depending on whether jobs to be executed by computers are distributed well or not. Also, since workstations (WS) have become widespread, control parameters for load distribution have become complicated and it is difficult to efficiently distribute loads.

On the other hand, because the scale and functionality of applications have advanced, the processing time required for a computer system to execute an application program and obtain results has increased rapidly. An environment that allows stable job execution is required for all jobs that application programs intend to fulfill, but such an environment has not been realized. When causes of abnormal job termination prior to the completion of jobs are analyzed, it is found in many cases that a disk, which is a data storage means, has a shortage of capacity, and an operator makes a mistake and instructs the application to select incorrect data. Also, regarding a CPU where "I/O Wait" for a disk has occurred, the usage rate of that CPU has decreased considerably in many cases.

In order to control the load distribution described above, JP-A-10-49504 adopts a configuration where jobs are stored and kept as single jobs or job groups hierarchically on the basis of load distribution unit, and the jobs stored and kept in any hierarchy are transferred from a job registration machine to a job execution machine on the basis of that load distribution unit. However, sufficient attention is not paid to disk optimization or stabilization of program processes.

JP-A-11-3323 adopts a configuration where the load status is intensively monitored and managed, and the computer having the lowest load is selected based on the result of that monitoring and managing, and the selected computer is made to execute a job. Disks can be excluded from machine candidates that can execute the job by using a parameter. However, if excluding the disks by using the parameter is considered, the operation rate for the computers will decrease.

Furthermore, JP-A-10-334057 adopts a configuration where resources using batch job properties are classified and a batch job execution server with a resource load status that meets the relevant classification is dynamically decided based on information from a batch job execution server load status acquiring subsystem. However, sufficient attention is not paid to disk optimization or stabilization of program processes.

In other words, when an application program for RAID logical designing processes mass data by means of conventional load distribution techniques, the processing of a job to execute the application program sometimes becomes unstable, the job processing time increases, and a computer's access performance to the storage unit where the relevant data is stored sometimes decreases.

There is also a technique based on the idea of "DLCM" for effectively utilizing storage resources by distributing data to be accessed by a computer to a plurality of storage units. If data necessary for job execution does not exist in the storage unit accessed by the computer, there is the possibility, even in the environment where load distribution is realized, that an I/O access by the computer to the storage unit may enter the wait state or become an error. The same can be said about the case where the storage unit accessed by the computer does not have the necessary storage capacity for completing a job.

Accordingly, it is an object of the invention to provide a system, including a plurality of computers, for distributing loads on the computers wherein the access performance of the computers to a storage device, where data is stored, is enhanced and the computers thereby efficiently process jobs by executing an application program and where the TAT can be shortened.

SUMMARY

In order to achieve the object described above, the present invention is designed to optimize, at the time of job execution, a storage unit for storing necessary data for a computer to execute jobs and distribute loads on the computers when having the computer execute the jobs after the optimization.

Furthermore, the invention achieves the aforementioned object without delaying the processing of jobs, by adopting a queue structure and sequentially processing a plurality of jobs sent from a user device when performing the step of optimizing the storage unit and the step of having the computer execute the jobs after that optimization. Specific examples of the "optimization" include: migrating data referenced by the computer for executing jobs to a storage unit accessed by the computer before executing the jobs; and reserving the storage capacity necessary for the jobs in the storage unit.

According to a first aspect of the invention, a load distribution control system equipped with a plurality of computers, that distributes jobs requested by a user to the computers and has them execute the jobs is provided. The load distribution system includes: a storage unit accessed by the computers to execute the jobs; a first management device that makes a computer, which is selected from among the plurality of computers and has a lower load than the other computers, execute the job; a second management device that accepts the jobs requested by the user, queues the accepted jobs, and stores them sequentially in a first job queue; a third management device that fetches the jobs in the first job queue sequentially and executes data processing on the storage unit, wherein the data is necessary for the execution of the fetched jobs by the computer; and a second job queue for sequentially storing the jobs whose processing described above has finished as jobs waiting to be executed by the computer; wherein the first management device sequentially fetches the jobs from the second job queue and has the computer execute the fetched jobs.

According to a second aspect of the invention, a load distribution control method for selecting a computer having remaining calculation capability from among a plurality of computers and having the selected computer execute jobs is provided. The load distribution control method includes: a first step of storing jobs, for which a processing request is made to the computer, in a first queue; a second step of fetching the jobs from the first queue and executing processing of data, which is necessary for the execution of the fetched job, on a storage unit to be accessed by the computer when executing the jobs; a third step of storing the jobs, for which the processing in the second step has finished, in a second queue; and a fourth step of sequentially fetching the jobs in the second queue and having the selected computer execute the fetched jobs.

The invention can provide a system including a plurality of computers, for distributing loads on the computers wherein the access performance of the computers to a storage device, where data is stored, is enhanced and the computers thereby efficiently process jobs by executing an application program, and where the TAT can be shortened.

DETAILED DESCRIPTION OF PREFERRED EMBODIMENTS

Figure 1:
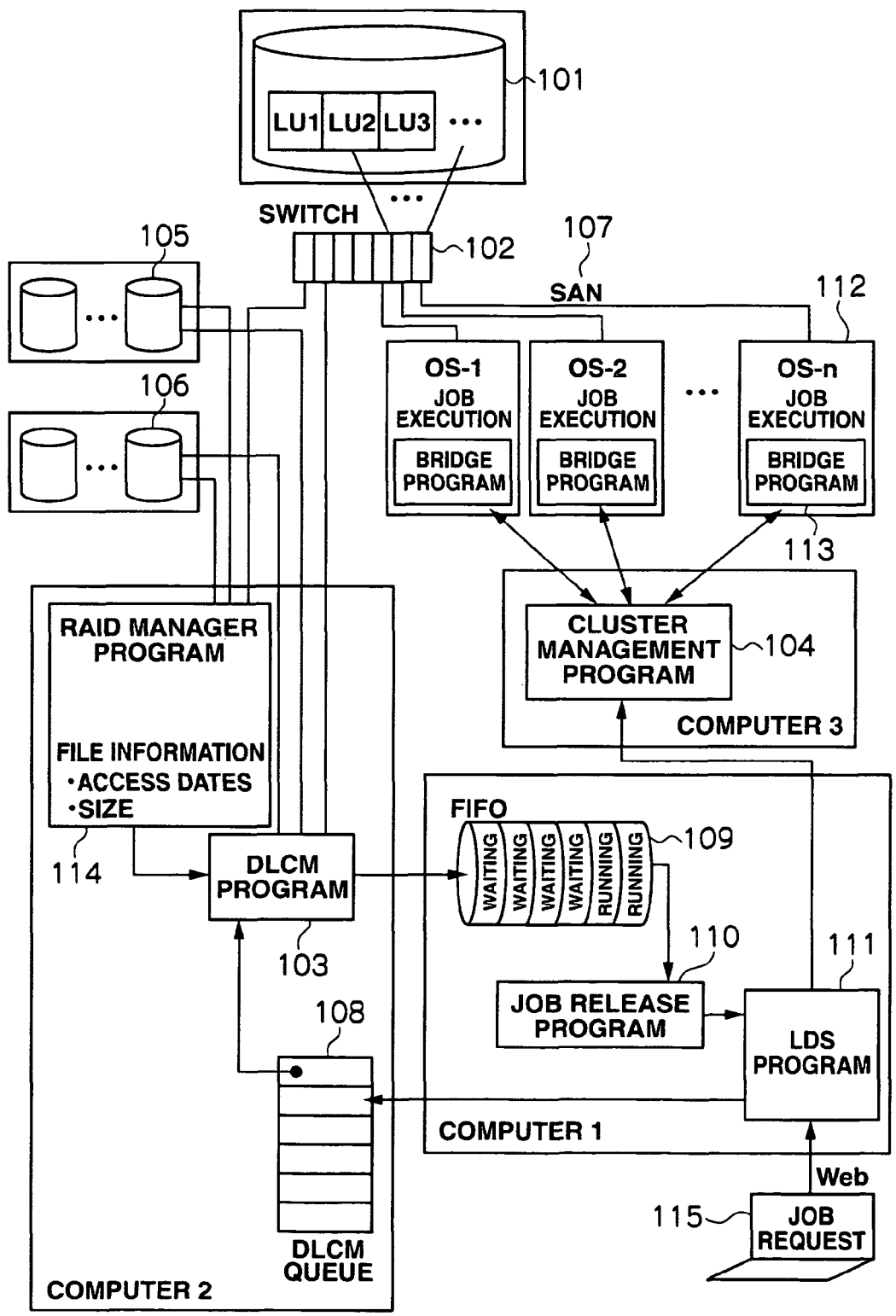
FIG. 1 is a block configuration diagram of a load distribution control system according to an embodiment of the invention.

Embodiments of the invention will be described below with reference to the attached drawings. FIG. 1 is a block diagram of a load distribution control system according to an embodiment of the invention. Referring to FIG. 1, the load distribution control system includes: a first storage unit 101 having a plurality of hard disk drives in array, that are configured according to the RAID (Redundant Arrays of Independent Disks) system and have an interface to which computers can make an I/O access at high speeds; a second storage unit 105 having disk drives of great capacity; a third storage unit 106 having archive disk units; and a group of computers 112 that execute jobs by sending/receiving information to/from the storage unit 101.

The storage unit 101 has a plurality of hard disk drives using a Fibre Channel interface. The storage unit 101 is connected to a switching hub 102 and, via a SAN (Storage Area Network) 107 as a network, to each computer 112. Storage resources of the storage unit 101 constitute logical volumes LU1, LU2, LU3, and so on. The switch 102 has a plurality of ports and the computers 112 are connected to specific ports. Since the logical volumes are mapped to the ports, the computers execute jobs by connecting to a specific logical volume. The storage unit 101 stores necessary data for job execution by the computers. The computers can access the data stored on the hard disk drives of the storage unit 101 at high speeds. The storage unit 101 is connected via the switching hub 102 to a management computer 2; the management computer 2 is connected to a management computer 1; and the management computer 1 is connected to a management computer 3.

Each computer 112 is configured as an execution computer for executing jobs. The OS's of the computers 112 do not have to be the same, and different OS's may be used. Each computer 112 contains a bridge program 113, separate from the job execution programs. The bridge program mediates between a cluster management program on the computer 3 and the job execution programs. A cluster means a group of computers 112. Multiple computers are formed into a group based on a standard [any standard], and these computers 112 forming a group are managed as a cluster.

The computer 1 serving as a job processing management device contains a FIFO (First-In-First-Out) 109, a job release program 110, and an LDS program 112. The computer 2 contains a RAID manager program for managing the storage units 101, 105, and 106, a DLCM queue 108, and a DLCM program 10, and is connected to the storage unit of great capacity 105 and the archive storage unit 106.

Next, "DLCM" will be described below. "DLCM" stands for "Data Life Cycle Management" which is a technique focused on the life of data to store data that has been accessed recently, and data that has not been accessed recently by computers such as the computer 112 executing jobs, in different storage areas. When using DLCM, since the former can be accessed by the computer 112 executing job, at high frequency and with a high degree of probability, the former is stored in the storage unit 101 having storage devices that can be accessed by the computers 112 at high speeds. Depending on the time that has elapsed since the last access, the latter data is stored first in the storage unit 105, and then in the storage unit 106. The storage unit 106 functions as an archive storage means for storing data that will not be accessed by the computers 112 for a while. The storage unit 106 may be a storage device equipped with a tape device.

The DLCM program 103 sequentially fetches a plurality of jobs stored in the DLCM queue, estimates a storage area with the necessary capacity for job execution, and checks whether or not the storage unit 101 has a storage area having such capacity. If the storage unit 101 does not have the necessary storage area, the DLCM program selects, from among data in the storage unit 101, data for which a certain period of time has elapsed since the last access, and migrates the selected data to the storage unit 105. As a result, the necessary storage capacity for job execution by the computers 112 is (created and) reserved in the storage unit 101. This storage capacity is allocated to the logical volumes in the storage unit 101 assigned for the computer 112 executing the jobs.

If the necessary data for job execution is not in the storage unit 101, the DLCM program migrates the data from the storage unit 105 or 106 to the storage unit 101. In this case, if the storage unit 101 does not have the necessary storage area, the storage area will be created in the storage unit 101 as described above.

Before executing jobs, the DLCM program prepares for the job execution by optimizing the storage unit 101 by, for example, storage area reservation and data migration among the storage units 101, 105, and 106 as described above. The DLCM queue is a job queue where the jobs are waiting for this preparation.

The computer 2 functions as a management device for managing the conditions of each storage unit by sending/receiving information to/from the storage units 101, 105, and 106. This function is performed by the RAID manager program. The RAID manager program manages file information about files stored in the storage units, such as dates of access to files, and file size.

As a load distribution processing unit, the computer 3 contains a cluster management program 104. The cluster management program 104 selects a computer to execute jobs from among a group (cluster) of computers 112 based on information from the computer 1 and commands the selected computer 112 to execute the jobs. The cluster management program 104 selects the computer that has the authority as a job execution computer to execute the jobs, and has the lowest CPU operation rate.

When the user utilizes the load distribution system configured as shown in FIG. 1, the user makes a request, for example, for an application job (hereinafter referred to as "job") to the computer 1 by using a Web computer 115 for the user to request jobs. The computer 1, following the LDS program 111, accepts the job request and transfers the accepted job to the DLCM queue 108 of the computer 2. The DLCM program 103 fetches the job transferred to the DLCM queue 108 and then processes the fetched job. The DLCM program 103 uses the RAID manager program 114 file information and performs the aforementioned optimization processing for the storage unit 101.

After the result of this processing is reported by the storage unit 101 via the switching hub 102 to the computer 2, the processing result of the DLCM program 103 is queued and the queued job is sent to the FIFO 109 of the computer 1. The FIFO 109 is a queue for jobs waiting to be executed, i.e., a queue for jobs for which the aforementioned storage unit 101 preparation processing has been completed. In other words, when the FIFO 109 receives the queued jobs, the storage unit 101 is ready for the execution of the jobs.

The job release program 110 executes queuing processing for the FIFO 109 and fetches a queued job stored in the FIFO while waiting for execution. The job release program 110 makes a request for processing of the queued job fetched from the FIFO 109 to an LDS (Load Distribution system) program 111. The LDS program functions to authenticate the requested jobs, send them to the DLCM queue 108, and send the jobs fetched from the FIFO to the cluster management program 104. Also, the LDS program 111 compares the content of the job requested via the Web computer 115 with the queued job; and if their contents correspond, the LDS program 111 sends the information about the job to the computer 3.

When the computer 3 receives the job, it executes the load distribution processing based on the processing of the cluster management program 104 and thereby selects the computer 112 to execute the job from among the group of computers 112 and sends the job to the selected computer 112. After receiving the job, the computer 112 executes it.

As described above, the computer 2 executes the data preparation processing and the empty space reservation processing for the storage unit 101 before the computer 112 executes the job. Accordingly, no storage unit I/O wait occurs in the process of job execution by the execution computer 112. In other words, the system in FIG. 1 can reduce the TAT taken from the start of the job until the completion of the job.

In addition, in the system in FIG. 1, the cluster management program 104 selects the computer to execute the job so that the CPU usage rates of as many computers as possible in a cluster will become very high, preferably 100%. For example, the cluster management program 104 is designed to assign jobs to the computer having the lowest CPU usage rate. In order to realize load distribution control, it is necessary to execute jobs in a well load balanced condition so that the CPU usage rate of the computers 112 will become 100%.

Accordingly, the maximum number of jobs that can be assigned to a computer 112 is indicated by the number of CPUs in the computer 112. The cluster management program 104 uses a parameter indicating the number of CPUs per computer 112 (the number of jobs the relevant computer can execute simultaneously) to calculate the remaining computation capability of each computer, and selects, based on the calculation result, a computer with which the maximum performance can be obtained, thereby distributing loads among the group of computers. This will be explained by referring to FIG. 2.

Figure 2:
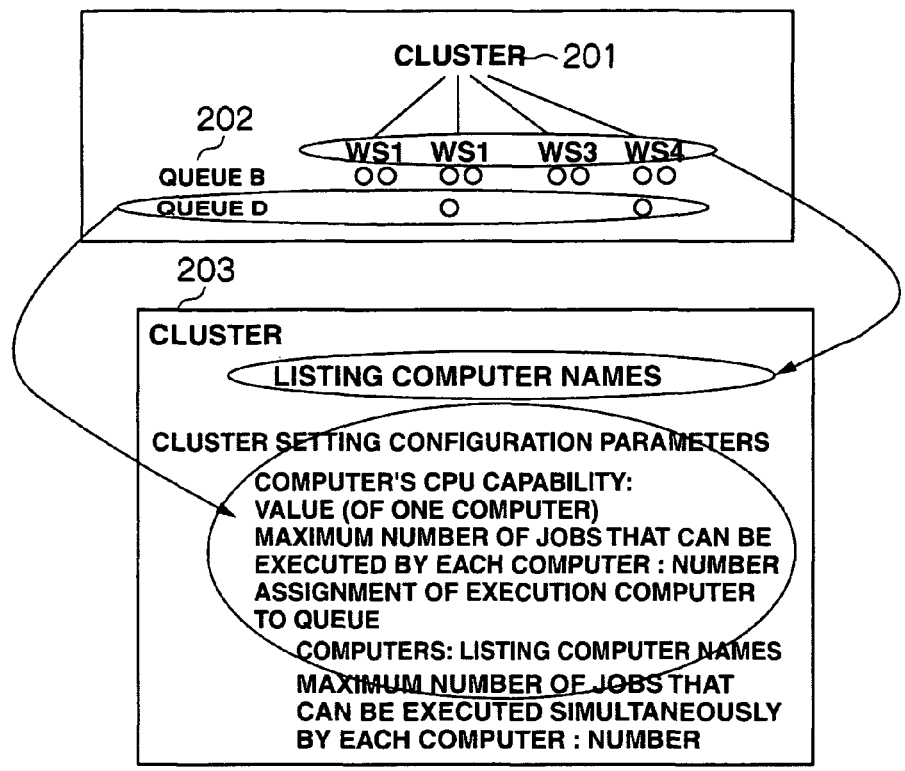
FIG. 2 is a diagram explaining a cluster management method.

As shown in FIG. 2, the computers 112 are divided into groups such as WS1, WS2, WS3, and WS4, and these computers are registered as a cluster 201 in a management table. WS1, WS2, WS3, and WS4 each correspond to a work station that executes jobs. A queue 202 indicating the processing order of jobs and cluster setting configuration parameters 203 is set for the cluster 201. The queue 202 is composed of job B (queue B) and job C (queue C). WS1, WS2, WS3, and WS4 have the authority to execute two queue B jobs at the same time respectively, and WS2 and WS4 have the authority to execute one queued job respectively. The maximum number of CPUs that can execute the queue B job at the same time is 6, while the maximum number of CPUs that can execute the queue C job at the same time is 2.

As the cluster setting configuration parameters 203, CPU capability and the number of jobs that can be executed simultaneously are set for each computer. As parameters defining the queues, the names of computers that can execute the relevant queued job and the number of jobs corresponding to the relevant queue that can be executed simultaneously by each computer are set. Then, the cluster management program 104 uses these parameters and the present number of jobs being executed to prepare a cluster management table 204. Based on the content of the cluster management table 204, the cluster management program 104 calculates the remaining computation capability of each computer and makes a request for a job to a computer with the highest remaining computation capability value based on the above calculation result.

In this case, the cluster management program 104 manages the job for which it made a request for the job execution by the computer, by using a login name of the job-requesting computer and a job management number in a running job management table 205. Accordingly, the cluster management program 104 can calculate the remaining computation capability of each computer (WS1, WS2, WS3, and WS4) by managing the number of jobs executed by each computer (WS1, WS2, WS3, and WS4).

The cluster management program 104 realizes the load distribution control which achieves the shortest TAT by selecting the computer with highest remaining computation capability from among the cluster and having the selected computer execute a job. In order for the cluster management program 104 to realize the load distribution control, it is necessary to acquire, from each computer 112, information about the number of jobs being executed on the computer 112 and the number of jobs that can be executed simultaneously (this is equal to the number of CPUs in the computer). The computer needs to reply with the number of jobs being executed in response to the inquiry from the cluster management program 104.

Figure 3:
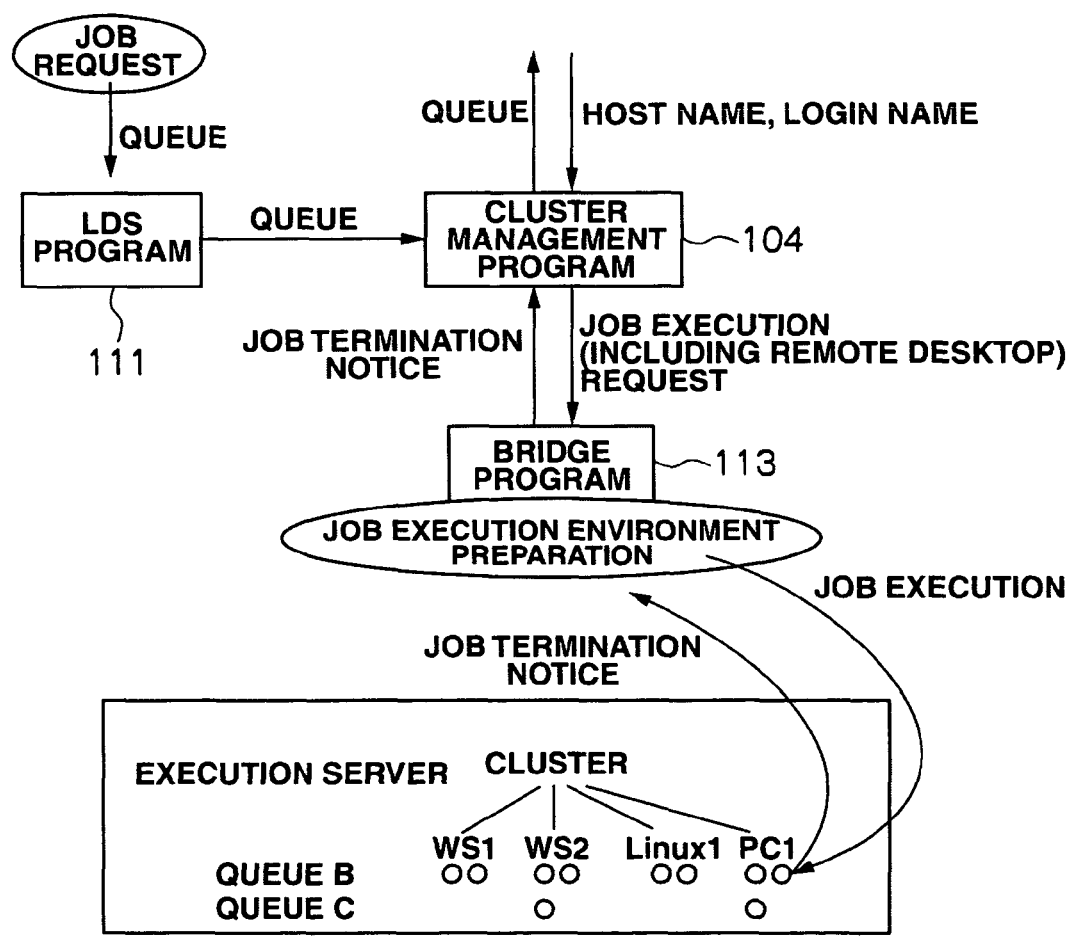
FIG. 3 is a diagram explaining a method for finding out the number of executed jobs.

However, if an attempt is made to support a PC as the execution computer 112, and the PC operates under the control of a single-task OS and cannot process multiple tasks, the execution computer 112 sometimes cannot reliably respond to the inquiry from the cluster management program 104. So, the function that: relays a job from the cluster management program 104, which requests jobs, to a job execution program of the execution computer 112; manages the status of the job for which a request for execution was made to the job execution program; and reports the status to the cluster management program 104 is separated from the execution program and then incorporated into the bridge program 113. Consequently, a PC can be used, other than the workstation, as the computer for executing jobs. The details will be described below with reference to FIG. 3.

In order for the cluster management program 104 to recognize with certainty the number of executed jobs, a job request is made by sending an execution command, a queue name, and the login name of the job requester to the LDS program 111. The LDS program 111 makes a job request to the cluster management program 104. The cluster management program 104 then increments the job management number by 1. The cluster management program 104 refers to the cluster management table 204 and decides to make the job request to the computer (WS2) having the highest remaining computation capability value, searches the running job management table 205 for an unused area in the selected computer, and registers the login name of the job requester and the job management number in that unused area.

The cluster management program 104 increments the present number of queues being executed by the decided computer to which the job request is made in the cluster management table 204 by 1 and, at the same time, executes processing for finding out the remaining computation capability of that computer. Also, the cluster management program 104 requests the bridge program 113 operating on the computer to execute the job. The job execution program of the computer (execution server) to which the job was requested increments the present number of jobs being executed by its computer by 1, and reports the termination of the job to the bridge program 113 of its computer when the job has been executed.

After the computer has executed the job requested by the bridge program 113, that job termination is reported to the bridge program 113, and the bridge program 113 decrements the number of jobs being executed by its computer by 1 and also reports that job termination to the cluster management program 104.

The cluster management program 104 which has received the job termination notice changes the area in the running job management table 205 where the content of the job assigned to the relevant computer is registered, to an unused state, and decrements the present number of queued jobs that are being executed by the computer in the cluster management table 204 by 1. At the same time, the cluster management program 104 executes processing for finding the remaining calculation capacity of the computer.

If the cluster management table 204 has been deleted (for example, due to reboot for hardware failure, or process deletion), it is necessary to restore the present number of jobs being executed by each computer executing jobs. The cluster management program 104 makes an inquiry to the bridge program 113, which manages the number of executed jobs, about the number of executed jobs, acquires the number of executed jobs from the bridge program 113, and restores the cluster management table 204.

Figure 4:
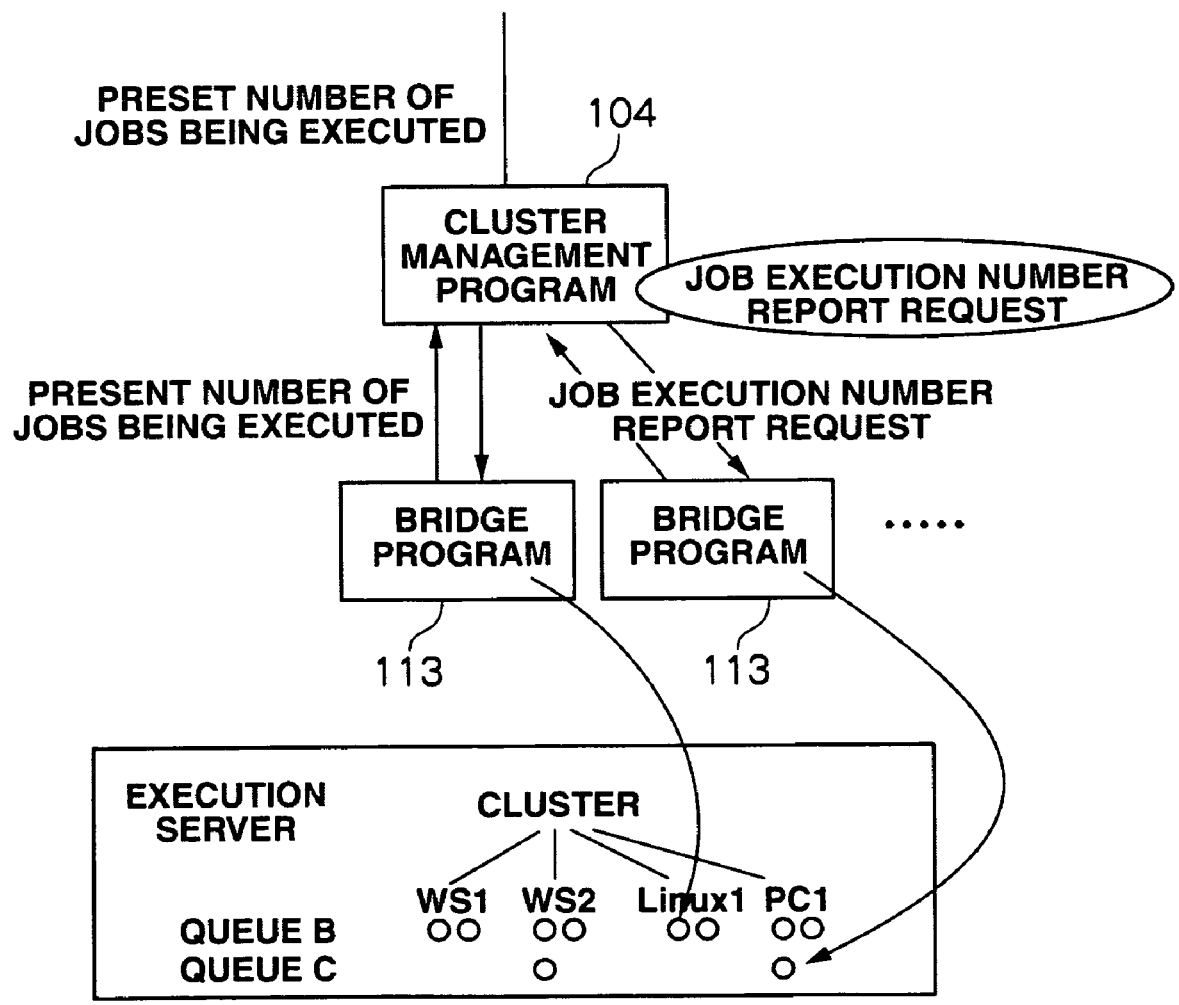
FIG. 4 is a diagram explaining a method for finding out the number of executed jobs.

The following description refers to FIG. 4. The cluster management program 104 of the computer 3, which manages clusters, requests a report on the present number of jobs being executed, from the bridge programs 113 of the computers constituting a cluster before creating the cluster management table 204 and the running job management table 205 for managing running jobs. The cluster management program 104 creates the management table 204 based on the reported number of jobs. This processing enables the cluster management program 104 to easily manage the remaining computation capability of the computer that executes jobs, and distribute loads (or jobs) to the computers constituting a cluster.

The system in FIG. 1 is brought about by cooperation between multiple programs. However, if any of the programs happens to cease operating for whatever reason, the system can no longer execute the load distribution processing and this results in 'system down.' Therefore, the programs need to be able to operate stably. With that in mind, it is desirable that the programs can detect their own deletion and regenerate. It is particularly desirable that all the programs have a regeneration function. This will be explained below referring to FIG. 5.

Figure 5:
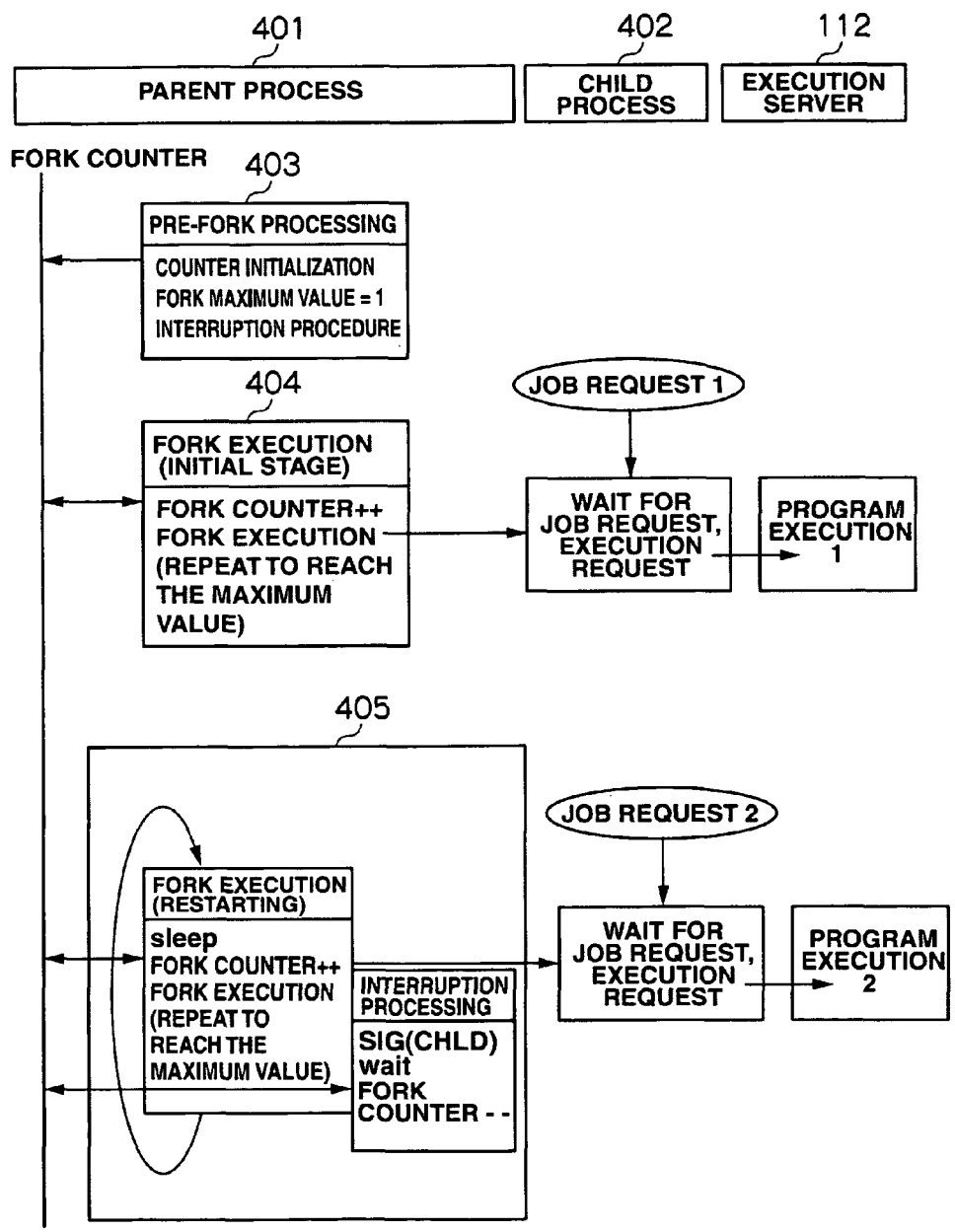
FIG. 5 is a diagram explaining a method for performing load distribution processing in highly-stable operation.

FIG. 5 describes a configuration in which "fork processing" that is a system call of a computer divides the process according to the programs into a parent process 401 and a child process 402. The processing according to any program is achieved by the child process 402. The parent process 401 monitors the existence of the child process 402; and if the parent process 401 detects that the child process 402 has been deleted, the parent process 401 executes processing for regenerating the child process 402.

Specifically speaking, the parent process 401 executes prefork processing 403 that involves initializing a number of child processes and a child process counter and defining the procedures for when a child process termination signal is received. Next, in fork execution (at initial stage) 404, the parent process 401 executes the fork processing and increments the child process counter by 1.

Subsequently, in fork execution (retrying) 405, the parent process 401 waits for the termination of the child process. If the child process 402 has been deleted for whatever reason, the child process termination signal interrupts the parent process 401, and the parent process 401 executes the fork processing as many times as the number of deleted child processes by subtracting "1" from the child process counter that was set in advance. This configuration guarantees the processing according to the programs all the times and realizes a highly stable system that can regenerate the programs and continue the load distribution even if a failure such as deletion of a program occurs.

Figure 6:
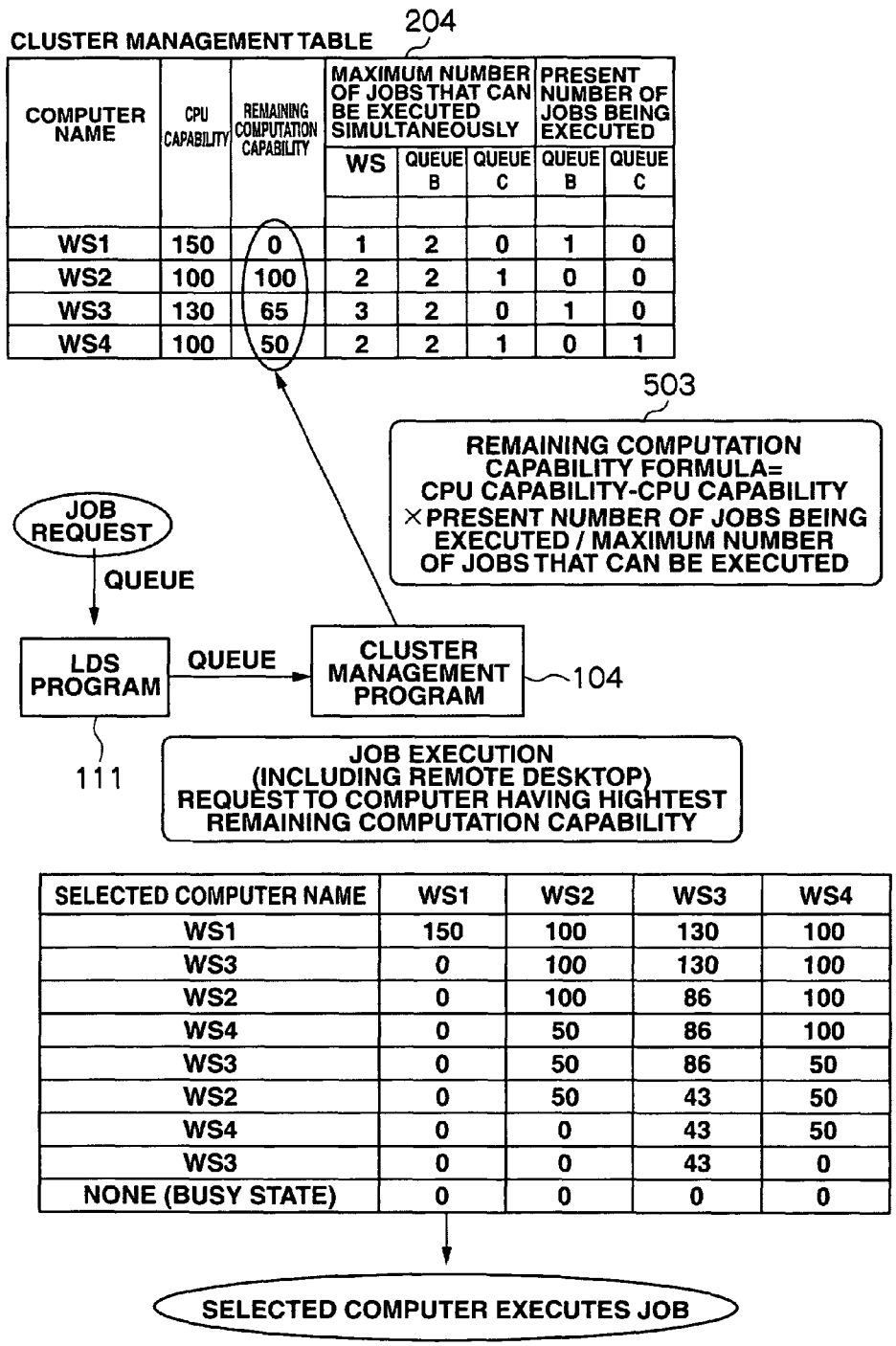
FIG. 6 is a diagram explaining an execution CPU selection method.

Next, the system of selecting a computer to execute jobs based on the remaining computation capability of the computers and distributing loads to the computers in a cluster will be described in detail, referring to FIG. 6. The cluster management program 104 first calculates the remaining computation capability of each computer by utilizing the CPU capability, the total present number of jobs being executed for all the queues, and the maximum number of jobs that can be executed simultaneously in the cluster management table 204 for each computer (WS1, WS2, WS3, and WS4). This calculating formula 503 is "the remaining computation capability=CPU capability−(CPU capability×total present number of jobs being executed for all the queues÷maximum number of jobs that can be executed simultaneously)." The cluster management program 104 performs this calculation for each computer (WS1, WS2, WS3, and WS4). The cluster management program 104 can select the computer with the highest remaining computation capability by finding the remaining computation capability of each computer at the point in time of the above calculation and comparing the calculation results. The computer selected in this manner is in the condition that allows the computer to use its CPU most efficiently at that point in time. The cluster management program 104 requests a job to the bridge program 113 of the selected computer. As described above, it is possible to find out the remaining computation capability of the computers using a few parameters and the simple calculating formula.

Figure 7:
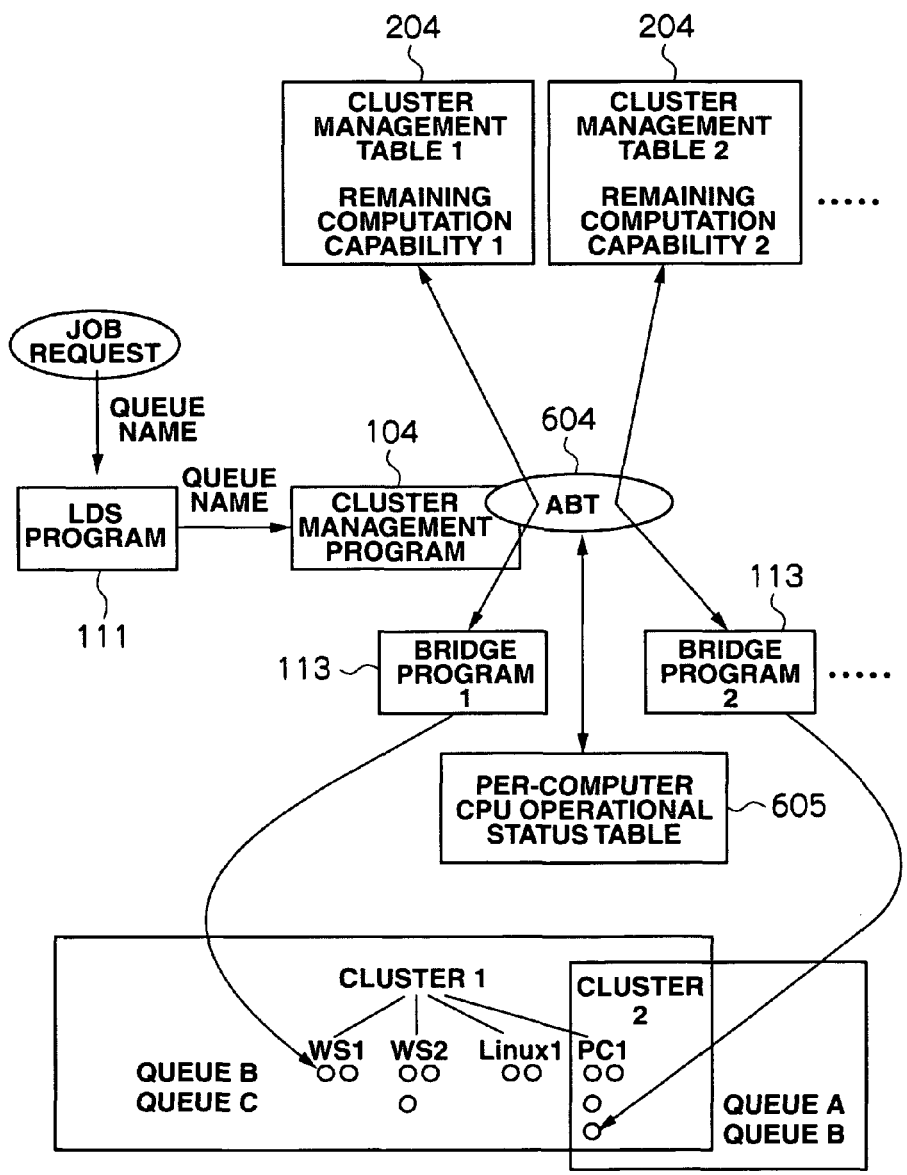
FIG. 7 is a diagram explaining a load distribution control method, using multi-clusters.

Since computers have become expensive and achieved high performance in recent years, they are used not only for one purpose, but sometimes for multiple purposes. If clusters are set for different purposes, computers are shared by the different clusters. This load distribution processing for the multi-cluster configuration will be described below by referring to FIG. 7.

A job released by the job release program from the FIFO 109 is sent by the LDS program 111 to the cluster management program 104. The cluster management program 104 assigns the job to a computer for executing the job by using cluster management tables (#1 to #n cluster management tables) 204 for all the clusters that can execute the queued job. An arbiter (ABT) 604 of the cluster management program 104 that functions to allocate jobs among multiple clusters assigns clusters (for example, cluster 1 and cluster 2) and computers (for example, WS1, WS2, and PC1) to jobs (. Also, the arbiter 604 recognizes the computers belonging to the cluster 1 and the cluster 2 and creates a table 605 that details the CPU operation status of each computer. This table is used for calculating the remaining capability of the computers. The cluster management program 104 enters the remaining computation capability for the relevant clusters in the relevant cluster management tables 204. Accordingly, the cluster management program 104 enables load distribution even if the multiple clusters share one computer.

Figure 8:
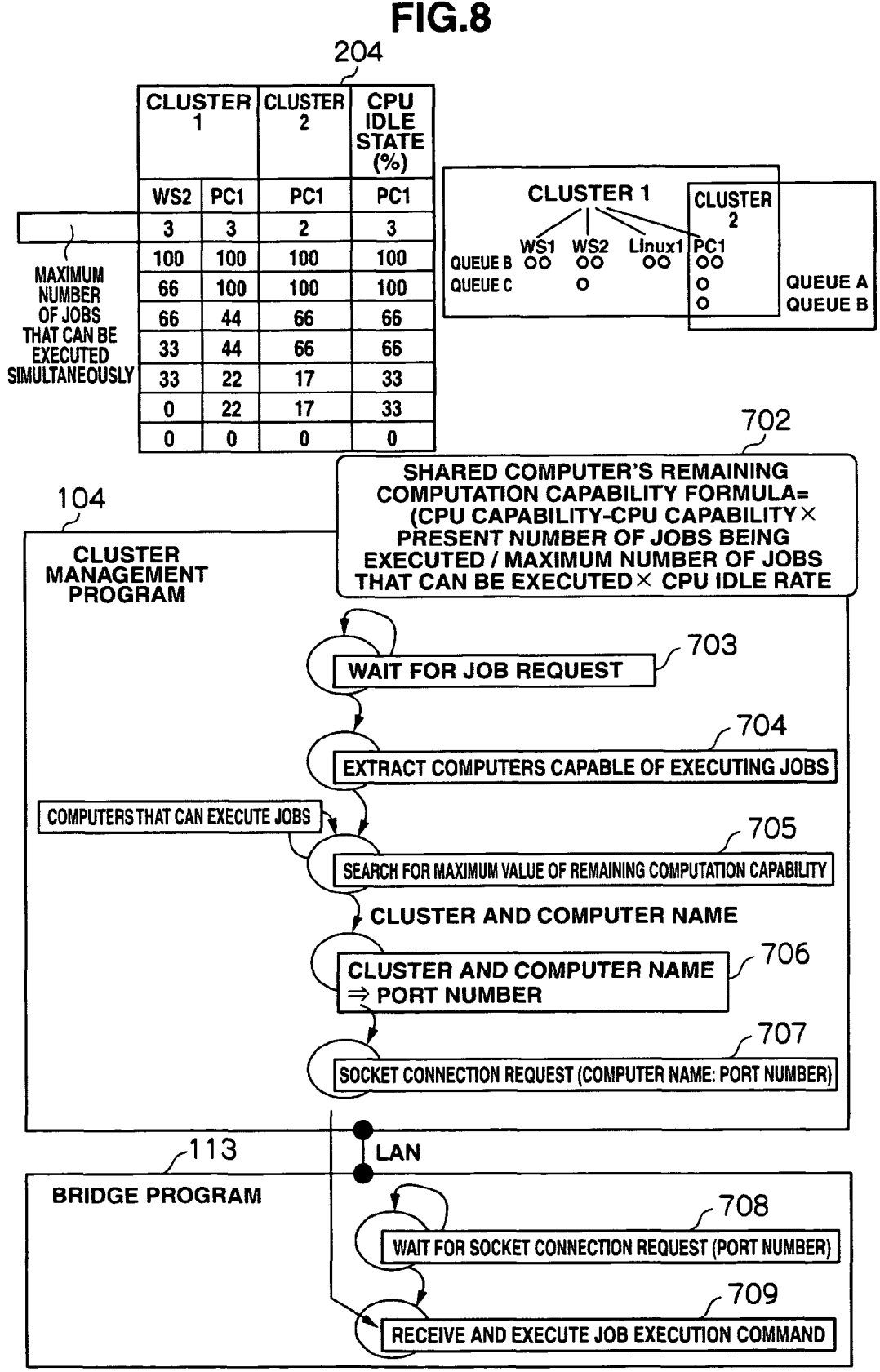
FIG. 8 is a diagram explaining an allocation control method, using multi-clusters.

Next, the sequence processing for selecting a computer to execute a job and having the computer execute the job will be described below by referring to FIG. 8.

The cluster management program 104 waiting for a job request accepts a job (step 703) and then selects computers that can execute the job (step 704). Specifically speaking, the cluster management program 104 uses the maximum number of jobs that can be executed simultaneously, the computers' remaining computation capability, and the CPU idle rate (%) of the computers shared by the multiple clusters in the cluster management table 204. In this case, the remaining computation capability values of all the computers before any job is assigned to them are set to the same value, for example, 100(%). The maximum number of jobs that can be executed simultaneously by the computer WS2 of the cluster 1 is set to "3," that of the PC1 of the cluster 1 is set to "3," and that of the PC1 of the cluster 2 is set to "2." The CPU idle rate of the computer PC1, which is shared by the multiple clusters is calculated by adopting the larger maximum number of jobs that can be executed simultaneously by PC1 of either the cluster 1 or the cluster 2.

The remaining computation capability values of all the computers are the same before the job request. So, the first entry of the cluster management table 204, i.e., WS2 of the cluster 1 is selected, and the remaining computation capability of the selected WS2 is calculated again. Next, PC1 of the cluster 1 is selected. Since PC1 is the computer shared by the multiple clusters, the remaining computation capability of PC1 is calculated again by multiplying the CPU idle rate by the result of the aforementioned calculating formula of the remaining computation capability. When the calculation is performed by using the remaining computation capability calculating formula 702 for the shared computer, the remaining computation capability of PC1 of the cluster 1 is: (100−100×1÷3)×0.66=44. Therefore, the remaining computation capability of PC1 of the cluster 2 is: (100−100×0÷2)×0.66=66.

The cluster management program 104 searches all the computers that can execute the job for the largest value of the remaining computation capability (step 705). Then, PC1 of the cluster 2 is selected as the computer to execute the job. According to the procedures described above, the largest remaining computation capability values are registered in the cluster management table 204, based on which the computer executing the job and its cluster name are decided.

As described above, the load distribution processing can be executed even in the case of the multiple clusters by recalculating the CPU's remaining computation capability, using the maximum number of jobs that can be executed simultaneously, the CPU's remaining computation capability, and the CPU idle status value of the computer shared by the multiple clusters in the cluster management table 204, as well as the aforementioned calculating formula.

Next, the processing sequence for requesting a job to the selected computer will be described. The cluster management program 104 requests job execution to the computer using the technique of socket communication to the bridge program 113 operating on the computer. Socket communication requires a computer name and a port number of a communication counterpart, and this port number is decided in advance for each cluster (steps 707 and 708). In other words, the port number is decided according to the cluster and the name of the computer for executing a job (step 706). If the computer for executing the job belongs to a plurality of clusters, as many bridge programs as the number of clusters operate. If the system configuration where each cluster has the bridge program 113 is employed, all the clusters can be restored when restarting the cluster management program 104.

The bridge program 113 always waits for a request of connection to the socket (step 708). When the bridge program 113 accepts a job from the cluster management program 104, it receives a job execution command from the cluster management program 104 and executes the job (step 709).

Figure 9:
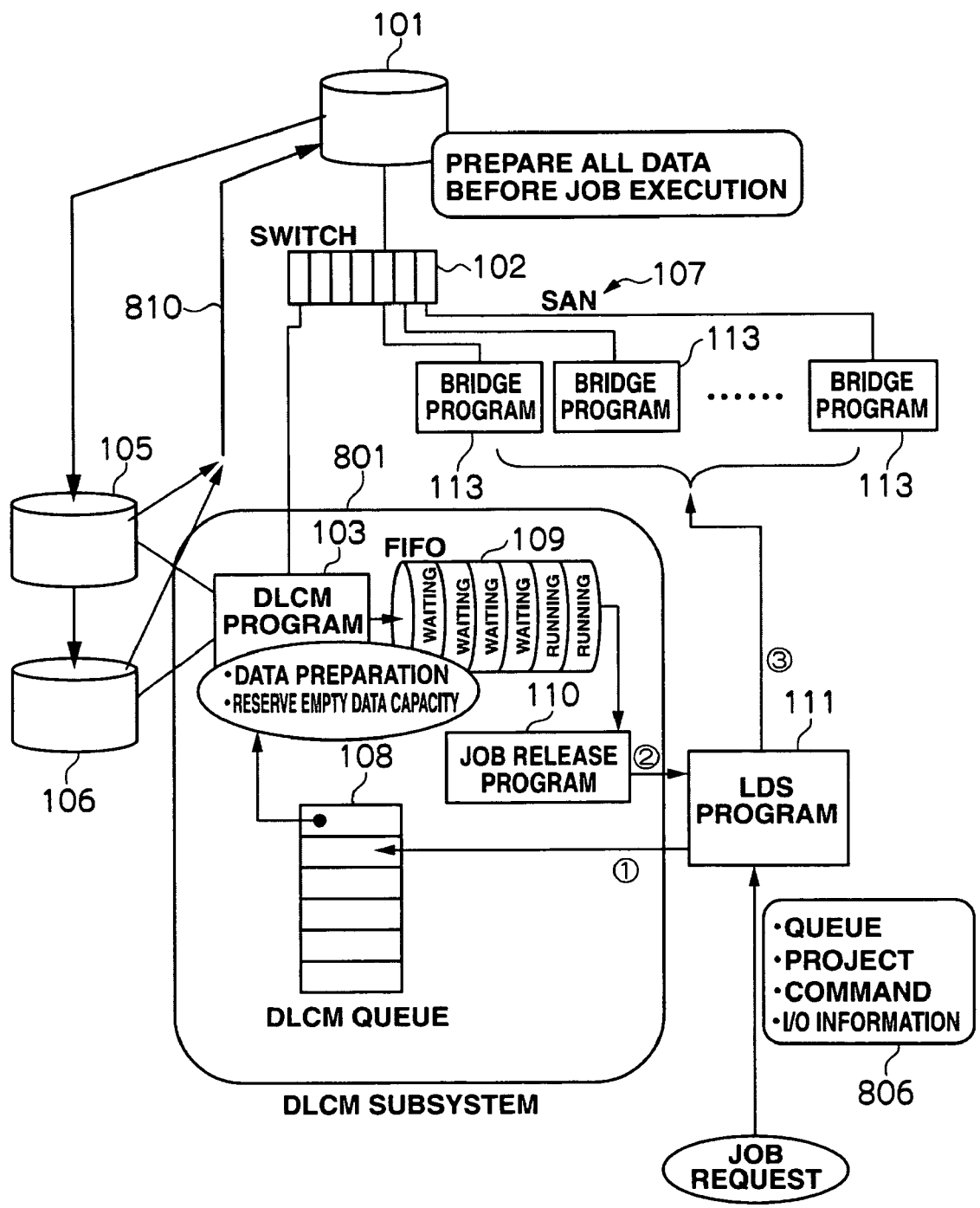
FIG. 9 is a block diagram explaining a DLCM configuration.

Next, a DLCM function added to the load distribution system in order to solve the problem of the computers' 112 inputs/outputs to/from a storage unit subsystem being held in a wait state and the inability to execute the job with maximum performance will be described below by referring to FIG. 9. Before the LDS program 111 accepts a job and the cluster management program 104 executes the load distribution processing, the job is first sent to a DLCM subsystem 801. The job is stored once in a DLCM queue. The DLCM program 103 sequentially takes jobs from the queue 108 and optimizes the storage area for the jobs in the storage subsystem 101.

The "optimization" is to adjust the storage resource before the job execution so that the computer executing the job will not enter the I/O wait state when accessing the storage resource. The DLCM program 103 realizes the optimization. For example, as explained in FIG. 1, the optimization includes: reserving the storage area for data necessary for the job execution in the storage subsystem 101; and/or migrating necessary data from other storage subsystems 105 and 106 to the storage subsystem 101. The job that has undergone the processing according to the DLCM program is stored in the FIFO, the job execution queue. The job release program 110 sequentially releases jobs from the FIFO and sends them back to the LDS program 111. Then, the LDS program 111 performs the load distribution processing by giving the job to the cluster management program 104. In other words, the condition where no disk I/O bottleneck occurs is prepared as the pre-processing for the load distribution processing, so that the job can be executed with the maximum performance.

In order to prepare data to be used for a job and reserve empty space (capacity) to be used for the job execution, the DLCM program 103, when requesting the job to the LDS program 111, adds I/O information 806, which indicates a bus for data to be used for the job, to the job request and sends the job from the LDS program 111 to the DLCM subsystem 801.

The DLCM function involves migrating data, based on the I/O information included in the job request, from the storage resource 105 having mass storage capacity and the storage resource 106 containing old data, to the storage resource 101 having an interface that can be accessed by the computer for executing the job at high speeds.

Also, the DLCM function involves estimating the data volume to be used in association with the job execution and continuing saving old data in chronological order from the storage subsystem 101 to the storage subsystem 105 until the empty data volume equal to the estimated volume is secured. If the storage subsystem 105 does not have any area for saving, data is saved in the storage area 106 in chronological order.

When this DLCM processing is completed, the job is sent to the FIFO 109 and enters the job execution wait state. The job release program 110 subsequently takes jobs from the FIFO 109 and requests jobs to the LDS program 111. The jobs returned to the LDS program 111 are sent to the load distribution processing.

Figure 10:
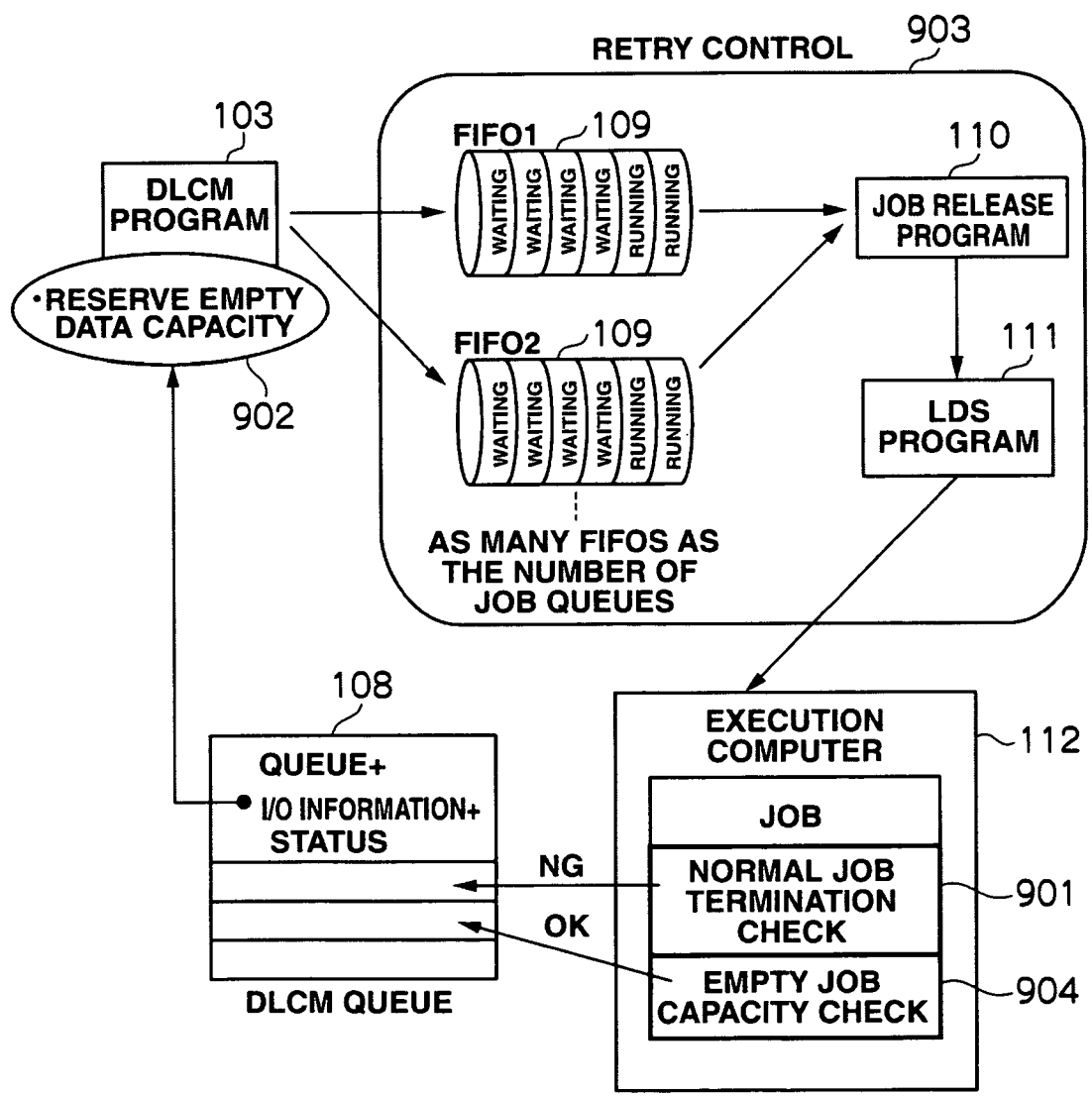
FIG. 10 is a diagram explaining a DLCM control system.

Next, the DLCUM function performed at the termination of a job will be described below by referring to FIG. 10. The storage capacity estimated before job execution and reserved in the storage unit 101 is sometimes insufficient, and a job may terminate abnormally at the computer 112. So, the computer 112 checks whether or not the job was terminated normally (901). If the job was not terminated normally, the computer 112 adds status information indicating the job was not terminated normally, to the job and stores the job in the DLCM queue again. The DLCM program 103 increases the estimated data capacity necessary for the job execution and performs the processing again for reserving an empty capacity in the storage subsystem (step 902). Then, the DLCM program 103 performs retry control (903) to re-enter the job in the FIFO 109 where the job will wait to be executed.

There can be as many FIFO(s) 109 as there are job types. For example, one FIFO is a queue for job type A, while another FIFO is a queue for job type B. The aforementioned DLCM queue does not exist for each job type, but is shared by all the job types. Examples of the job types are banking business related jobs and designing business related jobs.

If the job deals with mass data, but the job execution is terminated in a short period of time because of the load distribution processing, the optimization by the DLCM program 103 can be a bottleneck for the job execution.

In order to deal with this problem, the computer checks if any data capacity used for the job has remained or not after the termination of the job (904). If excessive data capacity was used compared to the estimated data capacity before the job execution, processing is executed for reserving empty capacity in the storage subsystem equivalent to the excessively used data capacity (902). This makes the empty data capacity reservation processing terminate in a much shorter period of time in the DLCM processing before executing next and any subsequent jobs. The bottleneck can be solved by reducing the period of time from a job request to its termination.

As a result, a high-quality and high-performance load distribution system can be realized by the DLCM subsystem 801 that has the DLCM function involving: before the job execution, the processing for preparing data necessary for the job in the storage subsystem 101 and reserving the empty capacity for the data necessary for the job; and after the job termination, the processing for reserving a data capacity equal to a difference between the data capacity estimated by the DLCM program and the actual data capacity, the re-processing for reserving an empty data capacity at the time of job abnormal termination due to an empty data capacity shortage, and the retry control.

Figure 11:
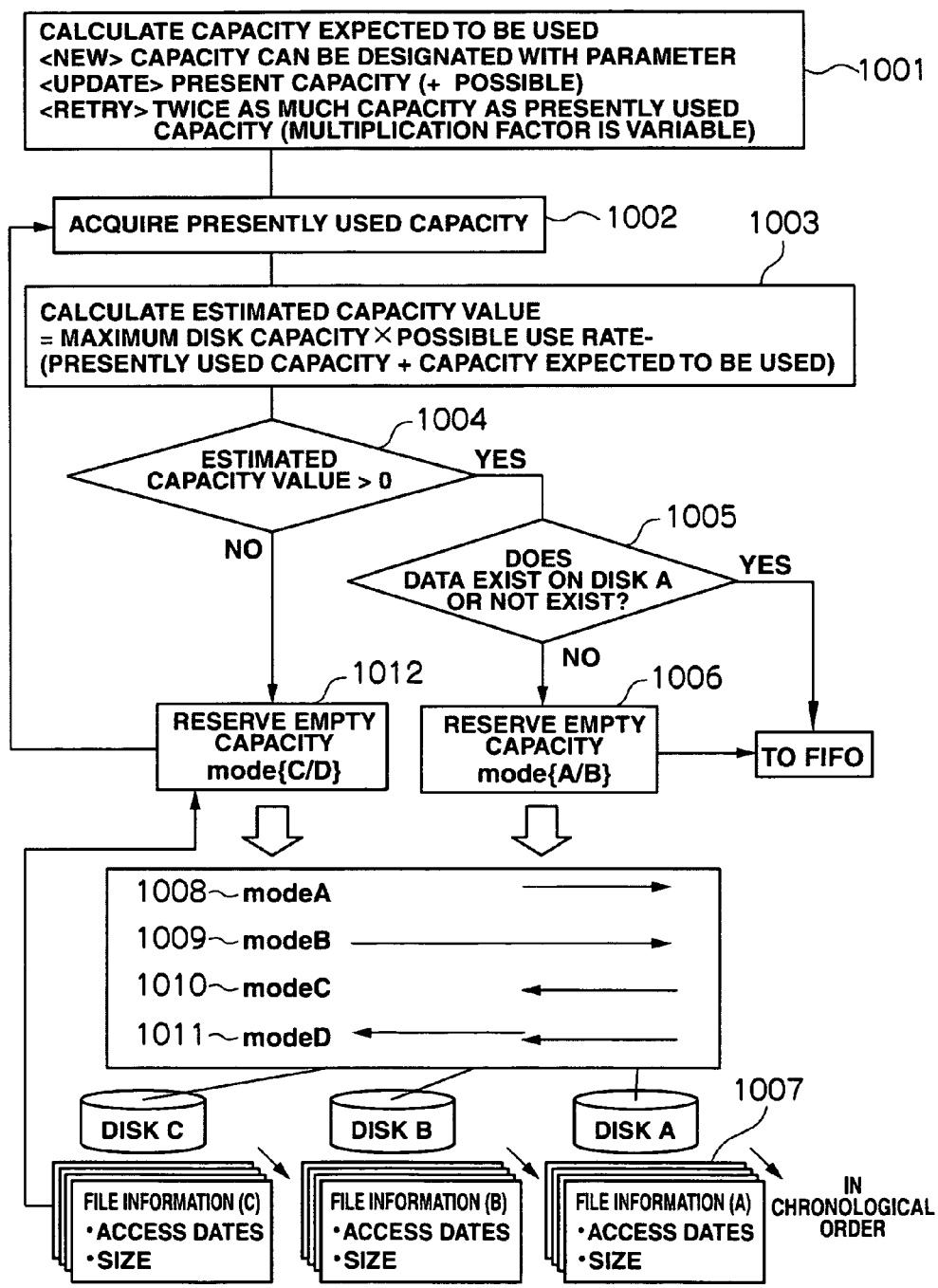
FIG. 11 is a diagram explaining a DLCM function.

The DLCM function will be described below by referring to FIG. 11. The DLCM program calculates the expected storage capacity for executing a job (step 1001). The calculation result will differ depending on file information 1007 corresponding to the I/O information designated by the computer 1, and whether the job is executed for the first time or is a retry. The file information 1007 contains information about dates of access to files in the storage unit 101 and file size. The file information includes the dates of access to files in chronological order.

If the I/O information designated by the computer 1 is not found in the file information of the storage unit 101, the file information of the storage unit 105, or the file information of the storage unit 106, the DLCM program of the computer 2 recognizes the job as a new job and reserves a storage capacity in the storage unit, using a storage capacity specified as a default. The storage capacity is indicated with a parameter. If the designated I/O information exists in somewhere in file information B or file information C, the DLCM program judges that the job is to update the relevant file, and then reserves the present capacity of that file in the storage unit. The DLCM program can add a specified capacity to the present capacity by designating a parameter to the storage unit 101. In the case of the job retry control, since the storage unit subsystem 101 does not have the data capacity necessary for the job, the DLCM program reserves, in the storage unit, as twice as much capacity as the present capacity of the relevant file necessary for the job execution. Incidentally, the DLCM program can change the multiplication factor by using a parameter.

Next, the DLCM program 103 acquires the storage capacity in the storage unit 101 that is used by the computer 112 (step 1002). Then, the DLCM program calculates an estimated capacity value (step 1003). The estimated capacity value is calculated by using the maximum storage capacity (maximum disk capacity) of the storage unit, a disk use rate within the range where no flag processing occurs (possible use rate), the presently used storage capacity, and the storage capacity expected to be used. The calculation formula for the estimated capacity value is: the maximum disk capacity×the possible use rate−(the presently used capacity+the capacity expected to be used).

If the estimated capacity value is more than "0" in step 1004, this means that the job is unlikely to be executed under the situation where the CPU operation rate has decreased because, for example, the job to be executed has terminated abnormally due to the I/O processing to the storage unit, or "I/O Wait" has occurred. In this case, except the case where the data already exists in the storage subsystem 101 or does not exist in any storage resource (step 1005), the DLCM program executes processing for preparing the data necessary for the job in the storage subsystem (step 1006). Subsequently, the DLCM program sends the job to the FIFO 109.

On the other hand, if the estimated capacity value is "0" or less, this means that it is highly possible that the job will be executed, under the situation where the CPU operation rate has decreased because, for example, the job to be executed has terminated abnormally due to the I/O processing to the storage unit, or "I/O Wait" has occurred. In this case, the DLCM program reserves empty capacity in the storage unit (step 1012).

In the data preparation processing (step 1006), the computer for executing the job performs processing for preparing data about the I/O information designated by the storage unit 101. The following processing is executed at this stage: mode A processing for migrating data existing in the storage unit 105 to the storage unit 101 (step 1008); and mode B processing for migrating data existing in the storage unit 106 to the storage unit 101 (step 1009).

In the mode A processing (step 1008), file information corresponding to the designated I/O information is acquired from the storage unit 105, and the data is migrated from the storage unit 105 to the storage unit 101.

In the mode B processing (step 1009), file information corresponding to the designated I/O information is acquired from the storage unit 106, and the data is migrated from the storage unit 106 to the storage unit 101. As a result of these processing sequences, the data to be used for the job are migrated to the storage unit 101.

The empty capacity reservation processing (step 1012) is executed to reserve the necessary empty capacity in the storage unit 101. There are two cases of the empty capacity reservation processing: the case where only mode C processing (step 1010) for migrating data from the storage unit 101 to the storage unit 105 should be executed; and the case where mode D processing (step 1011) for migrating data from the storage unit 105 to the storage unit 106 should be first executed, and the mode C processing (step 1010) should then be executed in order to migrate the data from the storage unit 101 to the storage unit 105.

In the mode C processing (step 1010) は, file information is fetched from the storage unit 101 in chronological order and the file information is stored as migration data until the total size of the file information becomes larger than the estimated capacity value. Accordingly, all the data corresponding to the stored file information are migrated from the storage unit 101 to the storage unit 105. The mode D processing (step 1011) has the same function as mode C processing (processing of step 110), and the migration source storage unit of the mode D processing is the storage unit 105 and the migration destination is the storage unit 106. As a result of the mode C processing, or both the mode D processing and the mode C processing in some cases, the necessary empty capacity data is reserved in the storage unit (disk A) 101.

Figure 12A:
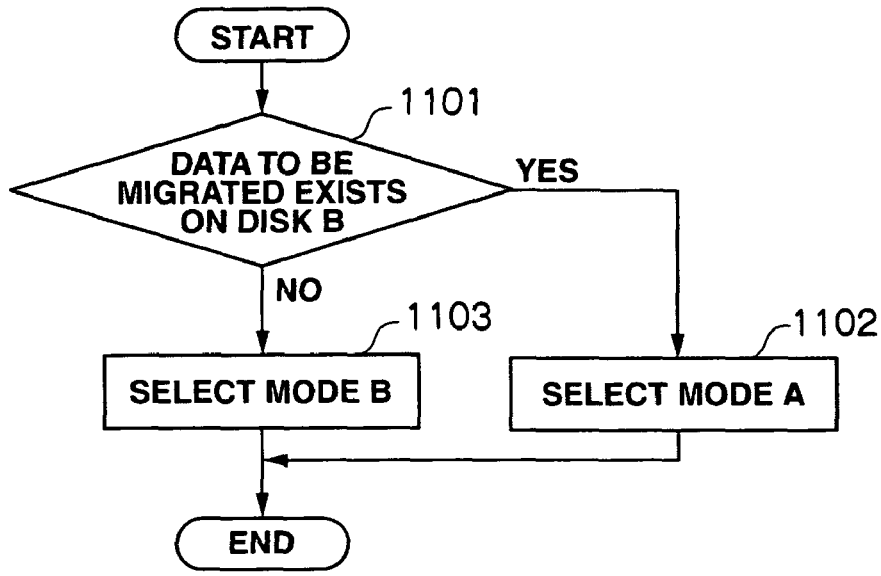
FIG. 12A is a diagram explaining a method for deciding a data preparation mode in the DLCM function.
Figure 12B:
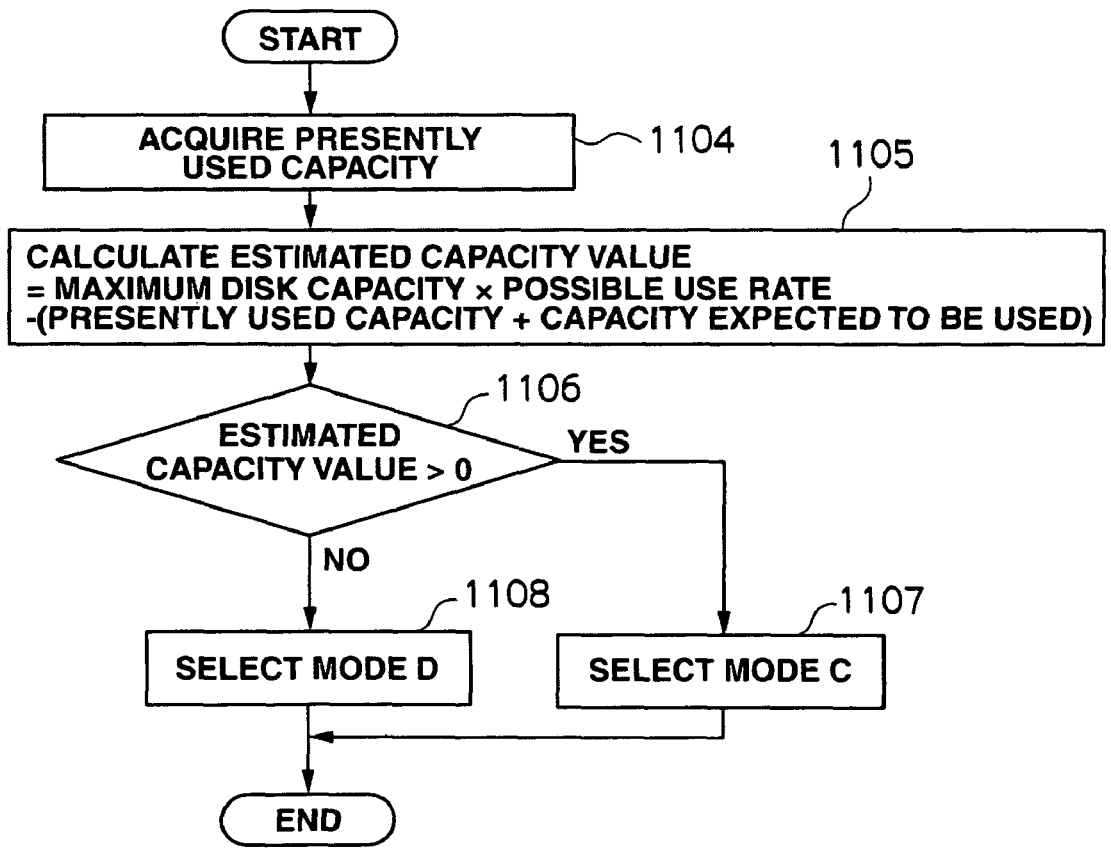
FIG. 12B is a diagram explaining a method for deciding an empty capacity reservation mode in the DLCM function.

Next, how to decide the data preparation mode and the empty capacity reservation mode in the DLCM function will be described by referring to FIG. 12. The case where the data preparation mode is decided by this system is limited to the case where the data to be migrated exists in the storage unit 105 or the storage unit 106. Accordingly, whether the data to be migrated exists in the storage unit 105 or not is checked (step 1101). If the data exists there, the mode is decided to be mode A (step 1102); or if the data does not exist there, the mode is decided to be mode B (step 1103).

Next, in order to decide the empty capacity reservation mode, the presently used capacity of the storage unit 105 is acquired (step 1104), and the estimated capacity value of the storage unit 105 is calculated by using the maximum disk capacity of the storage unit 105, the possible use rate of the storage unit 105, and the estimated capacity value already calculated. The calculating formula for the estimated capacity value (1105) is: the maximum disk capacity×the possible use rate−(the presently used capacity×the estimated capacity value). If the calculation result shows that the estimated capacity value is more than "0," the mode is decided to be mode C (step 1107); and if the calculation result shows that the estimated capacity value is "0" or less, the mode is decided to be mode D (step 1108).

After mode D is executed, the empty capacity reservation mode is decided again. This time, the mode to be executed is always decided to be mode C. As a result, after mode D is executed, mode C is executed.

Figure 13:
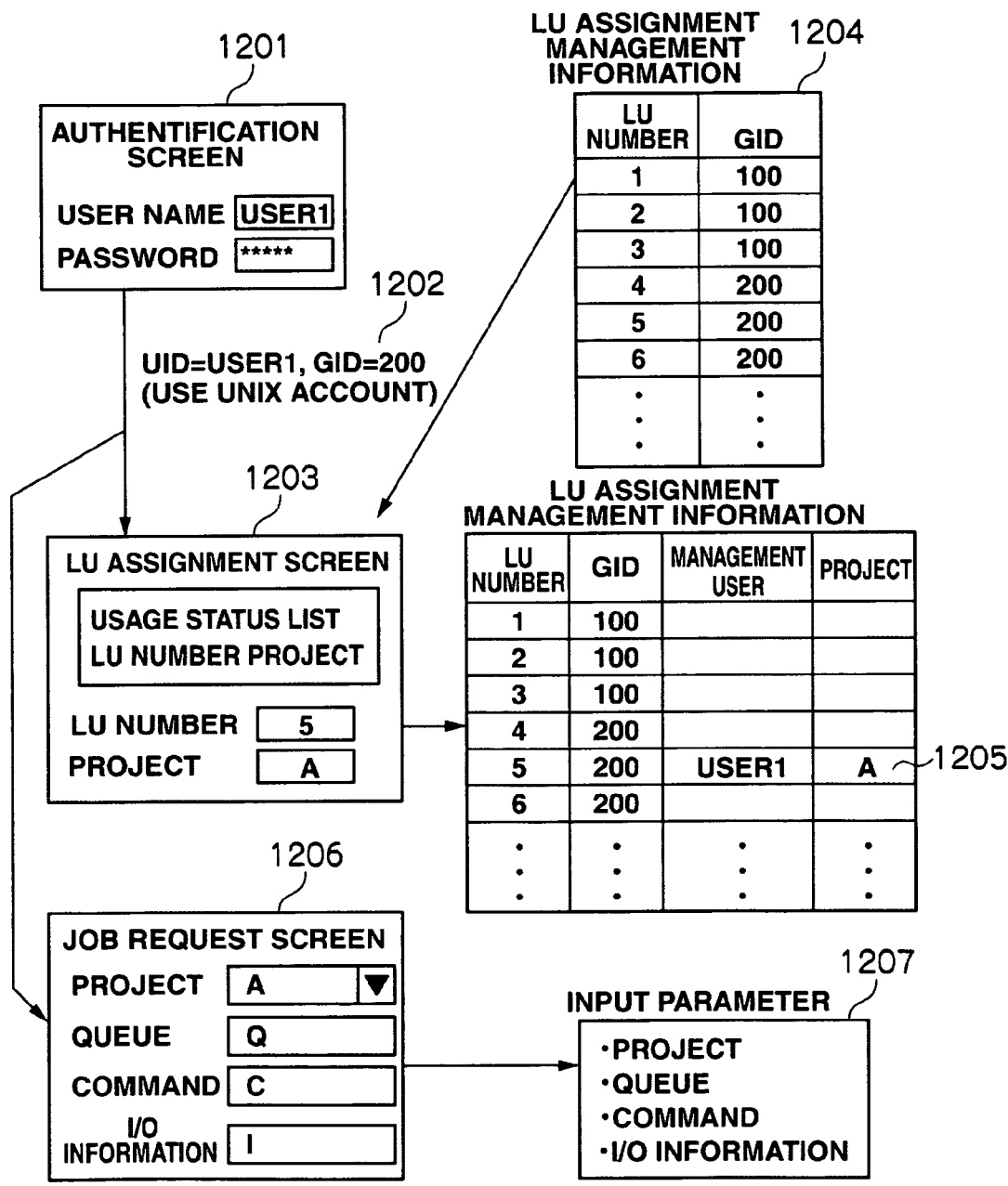
FIG. 13 is a diagram explaining a method for requesting a job via the web.

Next, a job request method will be described below by referring to FIG. 13. A user needs to be authenticated in order to use this system. This system utilizes, for example, UNIX® user account management. A Web authentification screen 1201 is used for a user authentification management function. The user is made to input a user name and a password, and the user authentification management function acquires GID for UID, using a UNIX® user account management program 1202, and checks whether the entered password matches the password for the UID or not. If the UID and the password successfully pass the check, this system can be used. Subsequently, the actual job request processing is executed, using the UID and the GUID.

First, an area to be used for the job is reserved in the storage unit 101. This area is reserved by assigning an LU to a project. The user decides the LU assignment by using an LU assignment screen 1203. The LU assignment screen 1203 displays a usage status list for the LUs that can be used by the user, based on LU assignment management information 1204 prepared by an administrator of the storage unit 101 in advance by defining GIDs corresponding to the LU numbers. The user decides the LU to be used in consideration of the relationship between the empty capacity of the storage unit 101 and preceding projects, and inputs the LU number and the project on the Web screen.

When the user completes input, the system registers the UID in a management user column on the line of the LU number designated by the user in the LU assignment management information 1204, and also registers the project in a project column on that line. The contents of the registration become the LU management information 1205.

Next, a job request will be explained. A job request is made by using the Web's job request screen 1206. The job request screen 1206 includes text input areas for inputting a project selection menu, a queue, a command, and I/O information. The project selection menu is prepared by extracting only the projects that match the user's GID based on the LU assignment management information 1205, and the relevant project is selected from the menu.

The user inputs the queue, the command, and the I/O information. When the user completes that input, the input information is sent as input parameters 1207 to this system in order to actually execute the job. In this system as described above, a job request can be made by utilizing the Web.

Figure 14:
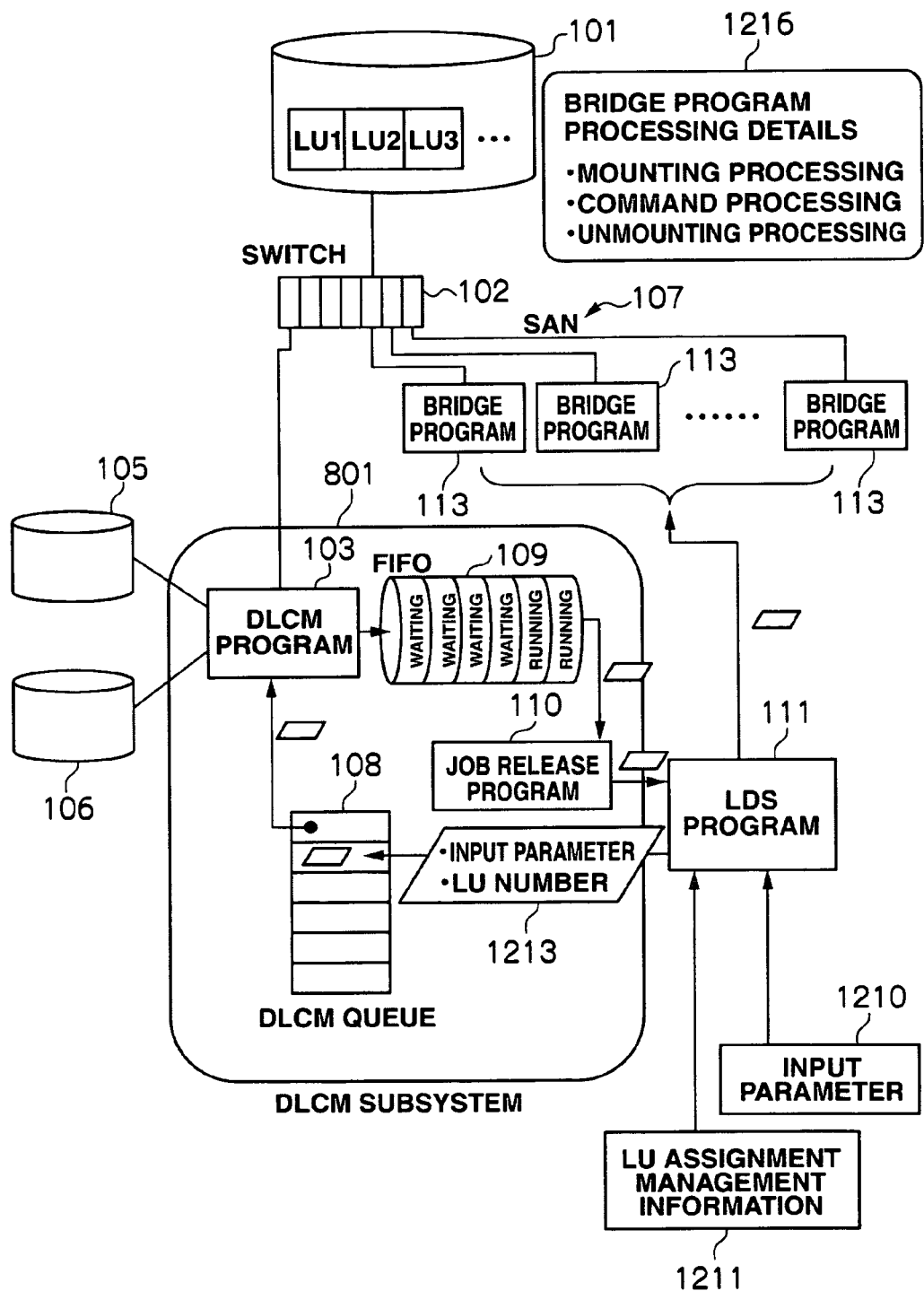
FIG. 14 is a diagram explaining a method for controlling logical units via the web.

Next, an LU control system will be described by referring to FIG. 14. In this system, a parameter 1210 input by the user via the Web is sent to the LDS program 111. The LDS program 111 compares the program information designated by the user with the project information in the LU assignment management information 1211 to find the matched LU number 1213, and then sends the LU number 1213 to the DLCM queue 108.

The DLCM program 103 fetches the entered parameter and LU number 1213 from the DLCM queue 108: The DLCM program 103 first reads and mounts the LU number corresponding to the storage unit 101, checks whether or not the designated I/O information already exists in the storage unit 101, and then unmounts the LU number. If the relevant I/O information does not exist in the storage unit 101, the DLCM program 103 reads and mounts the storage unit 105, checks whether or not the designated I/O information exists in the storage unit 105, and then unmounts the storage unit 105. If the designated I/O information does not exist in the storage unit 105, the DLCM program 103 performs the same processing for the storage unit 106. If the relevant I/O information does not exist in the storage unit 101, but exists in the storage unit 105 or the storage unit 106, the DLCM program 103 writes and mounts the relevant LU number of the storage unit 101, then writes and mounts the storage unit where the designated I/O information exists, migrates the I/O information, and unmounts both the storage units after the completion of the migration. Furthermore, after the empty capacity reservation processing, the DLCM program 103 sends the input parameter and the LU number 1213 fetched from the DLCM queue 108 to the FIFO 109.

The job release program 110 fetches the input parameter and the LU number 1213 from the FIFO 109 and sends them to the LDS program 111. The LDS program 111 sends the input parameter and the LU number 1213 to the cluster management program 104. The cluster management program 104 decides on a job execution computer and sends the input parameter and the LU number 1213 to the bridge program 113 of the decided computer. After the bridge program 113 mounts the received LU number of the storage unit 101, the bridge program 113 executes the command of the input parameter. After the termination of the command, the bridge program 113 unmounts the received LU number. When the user makes a job request via the Web, this system can automatically perform LU control for the storage unit 101 only by designating the project.

The storage unit in the above descriptions means a disk device or a disk array subsystem that includes storage media composed of a plurality of hard disks or optical disks, or a storage apparatus including a plurality of semiconductor memory units as storage media such as flash memory units.

What is claimed is:

1. A load distribution control system including a plurality of computers and distributing jobs to the computers to have them execute the jobs, the load distribution system comprising:
    a first storage unit to be accessed by the computers to execute the jobs;
    a second storage unit that stores data migrated from the first storage unit after expiration of a predetermined period of time from access by at least one of the computers;
    a first management device that exercises management for making a computer, from among the plurality of computers, that has a lower load than the other computers, execute the jobs;
    a second management device that accepts the jobs requested by a user, queues the accepted jobs, and stores them sequentially in a first job queue;
    a third management device that sequentially fetches the jobs in the first job queue and executes, on the first storage unit and the second storage unit, preparation processing for execution of the fetched jobs by the computer having the lower load; and
    a second job queue that sequentially stores the jobs for which the data preparation processing has been finished, as jobs that wait to be executed by the computer having the lower load;
wherein
the second management device sequentially fetches the jobs from the second job queue and sends the fetched jobs to the first management device, and the first management device has the computer having the lower load execute the fetched jobs, and
in the preparation processing, the third management device:
    if determining that I/O information corresponding to a requested job does not exist in a file in the first storage unit or in a file in the second storage unit, determines a predetermined storage capacity necessary for processing the requested job as a new job, as an expected capacity;
    if determining that the I/O information exists in the file of the second storage unit, determines that a capacity of the file as the expected capacity;
    if determining that the requested job is a retry job, determines predetermined multiples of capacity of the file corresponding to the job, as the expected capacity;
    judges whether or not the first storage unit has a capacity required for the requested job based on the capacity of the first storage unit that is currently being used by the computers and the expected capacity;
    when the judgment is negative, refers to information for a plurality of files in the first storage unit, selects at least one of plurality of files in chronological order of latest access to the files, until the amount of shortage of capacity of the first storage unit is reached, migrates data of the selected file from the first storage unit to the second storage unit, and allocates a capacity of the migrated data to the requested job; and
    if judging that a file storing I/O information corresponding to the requested job exists in the second storage unit, not in the first storage unit, migrates data of the file from the second storage unit to the first storage unit.

2. The load distribution control system according to claim 1, wherein the first storage unit includes a storage device that allows quicker access by the computer than that allowed in the second storage unit.

3. The load distribution control system according to claim 1, further comprising a third storage unit that stores data that will not be accessed by at least one of the computers for a while, wherein
in the preparation processing, the third management device:
    if determining that I/O information corresponding to a requested job does not exist in a file in the first storage unit, the second storage unit, or the third storage unit, determines a predetermined storage capacity necessary for processing the requested job as a new job, as an expected capacity;
    if determining that the I/O information exists in the file of the second storage unit or the third storage unit, determines that a capacity of the file as the expected capacity;
    if determining that the requested job is a retry job, determines predetermined multiples of capacity of the file corresponding to the job, as the expected capacity;
    judges whether or not the first storage unit has a capacity required for the requested job based on the capacity of the first storage unit that is currently being used by the computers and the expected capacity;

when the judgment is negative, refers to information for a plurality of files in the second storage unit, selects at least one of plurality of files in chronological order of latest access to the files, until the amount of shortage of capacity of the first storage unit is reached, migrates data of the selected file from the second storage unit to the third storage unit, then, refers to information for a plurality of files in the first storage unit, selects at least one of plurality of files in chronological order of latest access to the files, until the amount of shortage of capacity of the first storage unit is reached, migrates data of the selected file from the first storage unit to the second storage unit.

4. The load distribution control system according to claim 1, wherein the first management device calculates a remaining computation capability of each of the computers by using the number of CPUs mounted in each of the computers as a parameter, and selects the computer with the largest calculation capability as the computer to execute the requested job.

5. The load distribution control system according to claim 1, wherein the first management device has a program for managing the computers as a cluster, each computer has a bridge program for accessing the management program, and the computer receives/sends information related to the execution of the jobs from/to the cluster management program and the bridge program during the execution of the jobs.

6. The load distribution control system according to claim 5, wherein the first management device calculates a remaining computation capability of each of the computers configuring the cluster by using, as a parameter, the number of jobs each of the computers can execute simultaneously, and selects the computer with the largest calculation capability as the computer to execute the requested job.

7. The load distribution control system according to claim 1, wherein when the computer that should execute the requested job has finished the requested job, and if it has used, during the processing for the job, an excessively larger storage capacity than an empty capacity reserved in the storage unit prior to the execution of the requested job, the third management device reserves, in advance, an empty capacity including the excess amount of capacity in the first storage unit.

8. A load distribution control method for having a computer system, which includes a plurality of computers, a first storage unit to be accessed by the computers to execute the jobs, and a second storage unit that stores data migrated from the first storage unit after expiration of a predetermined period of time from access by at least one of the computers, distribute jobs to the computers to have them execute the jobs, the computer system executing:

a first step of exercising management for making a computer, from among the plurality of computers, that has a lower load than the other computers, execute the jobs;

a second step of accepting jobs requested by a user, queuing the accepted jobs, and storing them sequentially in a first job queue;

a third step of sequentially fetching the jobs in the first job queue and executing, on the first storage unit and the second storage unit, preparation processing for execution of the fetched jobs by at least one of the computers;

a fourth step of sequentially storing, in a second job queue, the jobs for which the preparation processing has been finished, as jobs that wait to be executed by the computer having the lower load;

a fifth step of sequentially fetching the jobs from the second job queue and having the computer execute the fetched jobs;

a sixth step of, if determining that I/O information corresponding to a requested job does not exist in a file in the first storage unit or in a file in the second storage unit, determining a predetermined storage capacity necessary for processing the requested job as a new job, as an expected capacity, while if determining that the I/O information exists in the file of the second storage unit, determining that a capacity of the file as the expected capacity, and if determining that the requested job is a retry job, determining predetermined multiples of capacity of the file corresponding to the job, as the expected capacity;

a seventh step of judging whether or not the first storage unit has a capacity required for the requested job based on the capacity of the first storage unit that is currently being used by one of the computers and the expected capacity and, when the judgment is negative, referring to information for a plurality of files in the first storage unit, selecting at least one of plurality of files in chronological order of latest access to the files, until the amount of shortage of capacity of the first storage unit is reached, migrating data of the selected file from the first storage unit to the second storage unit, and allocating a capacity of the migrated data to the requested job; and an eighth step of, if judging that a file storing I/O information corresponding to the requested job exists in the second storage unit, not in the first storage unit, migrating data of the file from the second storage unit to the first storage unit.

9. The load distribution control method according to claim 8, wherein the first storage unit includes a storage device that allows quicker access by the computer than that allowed in the second storage unit.

10. The load distribution control method according to claim 8, wherein the computer system further comprises a third storage unit that stores data that will not be accessed by at least one of the computers for a while, the method further comprising:

a ninth step of, if determining that I/O information corresponding to a requested job does not exist in a file in the first storage unit, the second storage unit, or the third storage unit, determining a predetermined storage capacity necessary for processing the requested job as a new job, as an expected capacity; if determining that the I/O information exists in the file of the second storage unit or the third storage unit, determining that a capacity of the file as the expected capacity; and if determining that the requested job is a retry job, determining predetermined multiples of capacity of the file corresponding to the job, as the expected capacity; and a tenth step of judging whether or not the first storage unit has a capacity required for the requested job based on the capacity of the first storage unit that is currently being used by the computers and the expected capacity, when the judgment is negative, referring to information for a plurality of files in the second storage unit, selecting at least one of plurality of files in chronological order of latest access to the files, until the amount of shortage of capacity of the first storage unit is reached, migrating data of the selected file from the second storage unit to the third storage unit, then, referring to information for a plurality of files in the first storage unit, selecting at least one of plurality of files in chronological order of latest access to the files, until the amount of shortage of capacity of the first storage unit is reached, and migrating data of the selected file from the first storage unit to the second storage unit.

11. The load distribution control method according to claim 8, further comprising:
    a ninth step of calculating a remaining computation capability of each of the computers by using the number of CPUs mounted in each of the computers as a parameter, and selecting the computer with the largest calculation capability as the computer to execute the requested job.

12. The load distribution control method according to claim 8, wherein the first management device has a program for managing the computers as a cluster, each computer has a bridge program for accessing the management program, and the method further comprising:
    a ninth step of receiving/sending information related to the execution of the jobs from/to the cluster management program and the bridge program during the execution of the jobs.

13. The load distribution control method according to claim 12, further comprising:
    a tenth step of calculating a remaining computation capability of each of the computers configuring the cluster by using, as a parameter, the number of jobs each of the computers can execute simultaneously, and selecting the computer with the largest calculation capability as the computer to execute the requested job.

14. The load distribution control method according to claim 8, further comprising:
    a ninth step of, when the computer that should execute the requested job has finished the requested job, and if it has used, during the processing for the job, an excessively larger storage capacity than an empty capacity reserved in the storage unit prior to the execution of the requested job, reserving, in advance, an empty capacity including the excess amount of capacity in the first storage unit.

* * * * *